(12) United States Patent
Hirooka

(10) Patent No.: US 7,692,669 B2
(45) Date of Patent: Apr. 6, 2010

(54) IMAGE PROCESSING APPARATUS, IMAGE PROCESSING METHOD AND IMAGE PROCESSING PROGRAM

(75) Inventor: Yoshiaki Hirooka, Higashiosaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 416 days.

(21) Appl. No.: 11/640,970

(22) Filed: Dec. 19, 2006

(65) Prior Publication Data

US 2008/0036774 A1 Feb. 14, 2008

(30) Foreign Application Priority Data

May 26, 2006 (JP) ............... 2006-146864

(51) Int. Cl.
```
G09G 5/00    (2006.01)
G09G 5/02    (2006.01)
H04N 1/387   (2006.01)
H04N 1/46    (2006.01)
G06K 9/36    (2006.01)
G06K 9/46    (2006.01)
G06F 17/00   (2006.01)
```

(52) U.S. Cl. ............... 345/619; 345/586; 345/581; 345/606; 345/643; 382/166; 382/235; 382/254; 382/276; 715/275; 715/800; 348/561; 358/453; 358/538

(58) Field of Classification Search ......... 382/164–166, 382/171, 173, 232, 235, 254, 276, 282, 190, 382/192, 194, 220–221, 228, 247, 284, 300, 382/309, 311; 345/606, 660, 618–619, 670, 345/472, 467, 472.1, 581, 586, 589, 630, 345/643; 715/200, 252, 275, 700, 764, 788, 715/800–801, 815; 348/557, 561, 568; 358/537–540

See application file for complete search history.

(56) References Cited

U.S. PATENT DOCUMENTS

| 6,891,978 | B1 | 5/2005 | Takano |
| 6,937,762 | B2 | 8/2005 | Fujiwara |
| 2002/0037100 | A1 | 3/2002 | Toda et al. |
| 2003/0118234 | A1 | 6/2003 | Tanaka et al. |
| 2003/0198381 | A1* | 10/2003 | Tanaka et al. ............ 382/166 |

(Continued)

FOREIGN PATENT DOCUMENTS

| JP | 2000-067248 | 3/2000 |
| JP | 2003-018412 | 1/2003 |
| JP | 2003-069843 A | 3/2003 |
| JP | 2003-189096 | 7/2003 |
| JP | 2004-188865 A | 7/2004 |

(Continued)

OTHER PUBLICATIONS

Japanese Office Action dated Nov. 13, 2007 (with English Translation).

*Primary Examiner*—Wesner Sajous
(74) *Attorney, Agent, or Firm*—Buchanan Ingersoll & Rooney PC

(57) ABSTRACT

If there is any unprocessed character area, and if there is any character area sharing a common character color with the unprocessed character area, the image processing apparatus calculates, as a first number, the total number of the pixels included in these two character areas. The image processing apparatus also calculates, as a second number, the number of pixels included in an area formed by integrating the two character areas. Then, the image processing apparatus judges whether the ratio of the first number to the second number is less than a predetermined threshold value. In other words, the image processing apparatus judges whether the following is satisfied:

Second Number/First Number<Threshold Value

If this is satisfied, the image processing apparatus integrates the areas, and also integrates the attribute information.

18 Claims, 12 Drawing Sheets

U.S. PATENT DOCUMENTS

| | | | |
|---|---|---|---|
| 2004/0022440 A1* | 2/2004 | Akahori | 382/224 |
| 2004/0037476 A1* | 2/2004 | Chen | 382/284 |
| 2004/0208368 A1 | 10/2004 | Yoshida | |
| 2006/0115167 A1* | 6/2006 | Itokawa | 382/239 |
| 2006/0159370 A1* | 7/2006 | Tanaka et al. | 382/305 |
| 2008/0247640 A1* | 10/2008 | Ukita | 382/165 |

FOREIGN PATENT DOCUMENTS

| | | |
|---|---|---|
| JP | 2004-304469 | 10/2004 |
| JP | 2005-223455 | 8/2005 |
| JP | 2005-236800 A | 9/2005 |
| JP | 2005-316813 A | 11/2005 |

* cited by examiner

FIG.8

| RATIO TO SIZE OF THE WHOLE DOCUMENT | THRESHOLD VALUE |
|---|---|
| LESS THAN 10% | 50 |
| 10%~30% | 20 |
| 30%~40% | 10 |
| 40%~50% | 5 |
| 50% OR MORE | 2 |

IMAGE PROCESSING APPARATUS, IMAGE PROCESSING METHOD AND IMAGE PROCESSING PROGRAM

CROSS-REFERENCE TO RELATED APPLICATIONS

This application is based on application NO. 2006-146864 filed in Japan, the contents of which are hereby incorporated by reference.

BACKGROUND OF THE INVENTION (1) Field of the Invention

The present invention relates to an image processing apparatus, an image processing method and an image processing program, and in relation to a Compact PDF file, particularly relates to a technique to compress an image with a high compression ratio in such a manner that a time required for displaying and printing a decompressed image is reduced.

(2) Description of the Related Art

In recent years, various compression methods for reducing a file size have been used for digitizing documents. Especially, a Compact PDF (Portable Document Format) method is promising as a method realizing a high compression ratio with maintaining a high quality of a decompressed image.

In the Compact PDF method, an image layer is formed for each object, such as a character and a figure included in an image. Image processing and image compression is performed in accordance with the type of the object included in the image layer. As a result, the Compact PDF method is capable of achieving both a high image quality and a high compression ratio.

FIG. 1 shows an example of the image layer. Image layers are respectively formed for objects such as characters and figures, which are included in an image on the left in FIG. 1.

However, each image layer is required to individually hold attribute information indicating the position of the object, the type of compression and so on. Therefore, if many image layers are included, the total data size of the attribute information is large. To reduce the total data size of the attribute information, a conventional art integrates image layers sharing a common attribute (See U. S. Patent Application Publication No. 2002/0037100 A1).

In FIG. 1, in the case where attribute information indicating that the character color is black is given to the image layer 1201 and attribute information indicating that the character color is red is given to the image layers 1202 and 1203, the image layers 1202 and 1203 will be integrated to form an image layer 1204.

In this way, the conventional art is capable of reducing the number of the image layers and reducing the total data size of the attribute information.

If such a conventional art is employed, in the case where objects to be integrated are away from each other, a blank space is added to the integrated image layer and the number of pixels included in the integrated image layer greatly increases (e.g. the image layer 1204 in FIG. 1). The blank space can be compressed with a high compression ratio. Therefore, the blank space does not affect the size of the compressed file.

However, to decompress the file for displaying and printing the image, it is necessary to decompress the blank space as well. This lengthens the time required for the decompression. Especially, in the case where objects are diagonally positioned so that they are away from each other, the blank space is large and the required time is greatly increased.

SUMMARY OF THE INVENTION

In view of the above-described problem, the object of the present invention is to provide an image processing apparatus, an image processing method and an image processing program that are capable of reducing a file size of a Compact PDF file, and reducing a time required for decompressing an image data.

The above object is fulfilled by an image processing apparatus that extracts a plurality of rectangular areas from image data, compresses an image included in each area, and gives an attribute of the area to the compressed image, the image processing apparatus comprising: a calculator operable to calculate a first number that is a total number of pixels included in areas sharing a common attribute and a second number that is a number of pixels included in an integration area that is a rectangular area including the areas sharing the common attribute; a judging unit operable to judge, based on the first number and the second number, whether or not to integrate the areas sharing the common attribute into the integration area; and an integration unit operable to integrate the areas sharing the common attribute if the judging unit judges affirmatively.

With the stated structure, the image processing apparatus judges whether to perform the integration with consideration of the number of the pixels before the integration and the number of the pixels after the integration, instead of performing the integration just because the areas share the common attribute.

Therefore, the image processing apparatus is capable of choosing not to perform the integration if the integration increases the number of pixels too much and needlessly extends the time required for decompressing the image. On the other hand, the image processing apparatus is capable of performing the integration if the difference between the number of pixels before the integration and the number of pixels after the integration is smaller than a predetermined number. This reduces the size of the PDF file.

The judging unit may judge affirmatively if a difference between the first number and the second number is not more than a predetermined value.

If this is the case, it is preferable that the image processing apparatus further comprises a receiving unit operable to receive a threshold value, wherein the judging unit uses the threshold value as the predetermined value.

With the stated structure, it is possible to decrease the threshold value if the printing time is more important than the file size, and to increase the threshold value if the file size is more important then the printing time. As a result, it is possible to meet the users' demand in a more flexible manner.

The judging unit may increase the predetermined value as the first number decreases.

With the stated structure, the image processing apparatus performs the integration only in the case where the number of the pixels before the integration is large and the increase of the number of the pixels due to the integration is relatively not serious. Therefore the image processing apparatus is capable of reducing the file size without increasing the printing time very much.

The integration area may include two rectangular areas.

With the stated structure, the image processing apparatus is capable of determining the rectangular areas based on only the positions of opposing two vertexes. This reduces the number of procedures required for judging whether to integrate the areas, and the time required for generating the PDF file is shortened.

The plurality of areas to be extracted from the image data may be character areas, and the integration area may include a plurality of character areas in which a difference of character colors is within a predetermined range.

With the stated structure, the image processing apparatus is capable of reducing the change in the image quality in the character area, and reducing the time require for decompressing the image with suppressing the file size.

An image processing method according to one aspect of the present invention is an image processing method for extracting a plurality of rectangular areas from image data, compressing an image included in each area, and giving an attribute of the area to the compressed image, the image processing method comprising: a first calculation step of calculating a first number that is a total number of pixels included in areas sharing a common attribute; a second calculation step of calculating a second number that is a number of pixels included in an integration area that is a rectangular area including the areas sharing the common attribute; a judging step of judging, based on the first number and the second number, whether or not to integrate the areas sharing the common attribute into the integration area; and an integration step of integrating the areas sharing the common attribute if the judging step judges affirmatively.

With the stated structure, the image processing method judges whether to perform the integration with consideration of the number of the pixels before the integration and the number of the pixels after the integration, instead of performing the integration just because the areas share the common attribute.

Therefore, the image processing method is capable of choosing not to perform the integration if the integration increases the number of pixels too much and needlessly extends the time required for decompressing the image. On the other hand, the image processing method is capable of performing the integration if the difference of the number of pixels before the integration and the number of pixels before the integration is smaller than a predetermined number. This reduces the size of the PDF file.

The judging step may judge affirmatively if a difference between the first number and the second number is not more than a predetermined value.

If this is the case, it is preferable that the image processing method further comprises a receiving step of receiving a threshold value, wherein the judging step uses the threshold value as the predetermined value.

With the stated structure, it is possible to decrease the threshold value if the printing time is more important than the file size, and to increase the threshold value if the file size is more important then the printing time. As a result, it is possible to meet the users' demand in a more flexible manner.

The judging step may increase the predetermined value as the first number decreases.

With the stated structure, the image processing method performs the integration only in the case where the number of the pixels before the integration is large and the increase of the number of the pixels due to the integration is relatively not serious. Therefore the image processing method is capable of reducing the file size without increasing the printing time very much.

The integration area may include two rectangular areas.

With the stated structure, the image processing method is capable of determining the rectangular areas based on only the positions of opposing two vertexes. This reduces the number of procedures for judging whether to integrate the areas, and the time required for generating the PDF file is shortened.

The plurality of areas to be extracted from the image data may be character areas, and the integration area may include a plurality of character areas in which a difference of character colors is within a predetermined range.

With the stated structure, the image processing method is capable of reducing the change in the image quality in the character area, and reducing the time require for decompressing the image with suppressing the file size.

Also, an image processing program according to another aspect of the present invention is an image processing program for extracting a plurality of rectangular areas from image data, compressing an image included in each area, and giving an attribute of the area to the compressed image, the image processing program having a computer perform: a first calculation step of calculating a first number that is a total number of pixels included in areas sharing a common attribute; a second calculation step of calculating a second number that is a number of pixels included in an integration area that is a rectangular area including the areas sharing the common attribute; a judging step of judging, based on the first number and the second number, whether or not to integrate the areas sharing the common attribute into the integration area; and an integration step of integrating the areas sharing the common attribute if the judging step judges affirmatively.

With the stated structure, it is possible to judge whether to perform the integration with consideration of the number of the pixels before the integration and the number of the pixels after the integration, instead of performing the integration just because the areas share the common attribute.

Therefore, it is possible to choose not to perform the integration if the integration increases the number of pixels too much and needlessly extends the time required for decompressing the image. On the other hand, it is possible to perform the integration if the difference of the number of pixels before the integration and the number of pixels before the integration is smaller than a predetermined number. This reduces the size of the PDF file.

The judging step may judge affirmatively if a difference between the first number and the second number is not more than a predetermined value.

If this is the case, it is preferable that the image processing program further having a computer perform a receiving step of receiving a threshold value, wherein the judging step uses the threshold value as the predetermined value.

With the stated structure, it is possible to decrease the threshold value if the printing time is more important than the file size, and to increase the threshold value if the file size is more important then the printing time. As a result, it is possible to meet the users' demand in a more flexible manner.

The judging step may increase the predetermined value as the first number decreases.

With the stated structure, it is possible to perform the integration only in the case where the number of the pixels before the integration is large and the increase of the number of the pixels due to the integration is relatively not serious. Therefore the image processing program is capable of reducing the file size without increasing the printing time very much.

The integration area may include two rectangular areas.

With the stated structure, it is possible to determine the rectangular areas based on only the positions of opposing two vertexes. This reduces the number of procedures required for judging whether to integrate the areas, and the time required for generating the PDF file is shortened.

The plurality of areas to be extracted from the image data may be character areas, and the integration area may include a plurality of character areas in which a difference of character colors is within a predetermined range.

With the stated structure, it is possible to reduce the change in the image quality in the character area, and reducing the time require for decompressing the image with suppressing the file size.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings:

FIG. 8 shows a table in which a threshold values are respectively assigned to ranges of a size ratio of unintegrated character areas;

DESCRIPTION OF THE PREFERRED EMBODIMENT

The following describes an embodiment of an image processing apparatus with reference to drawings, taking an MFP (Multi Function Peripheral) as an example.

(1) Structure of MFP

Firstly, the structure of an MFP according to the embodiment of the present invention is described.

Figure 2:
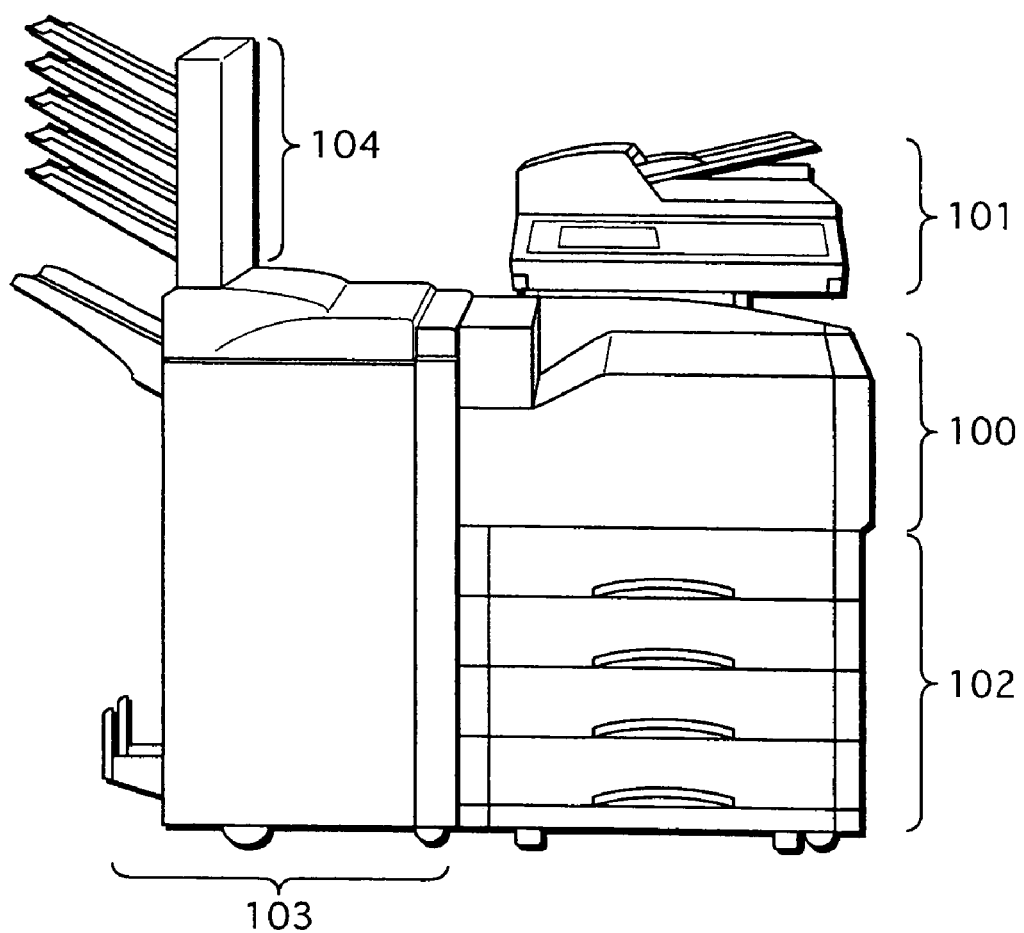
FIG. 2 shows an appearance of an MFP according to an embodiment of the present invention.

FIG. 2 is an appearance view of the MFP according to the embodiment. As FIG. 2 shows, an MFP 1 includes an image forming apparatus 100, an image scanner 101, a paper feeder 102, a finisher 103 and a multi-tray 104. The image scanner 101 carries a document using an automatic document feeder, and scans images on the document as a 24-bit full color image at 300 dpi.

If an A4-size document is scanned at 300 dpi, an image data including 2500×3500 pixels can be obtained.

The image forming apparatus 100 forms an image on a recording paper provided by the paper feeder 102, based on the scanned image data. The image forming apparatus 100 also generates a file by compressing the image data, and attaches the file to an e-mail to transmit the file to an external apparatus connected to the MFP via a network. The recording paper on which the image has been formed is ejected to the finisher 103 or the multi-tray 104.

(2) Structure of Image Forming Apparatus 100

The structure of the image forming apparatus 100 is described next.

Figure 3:
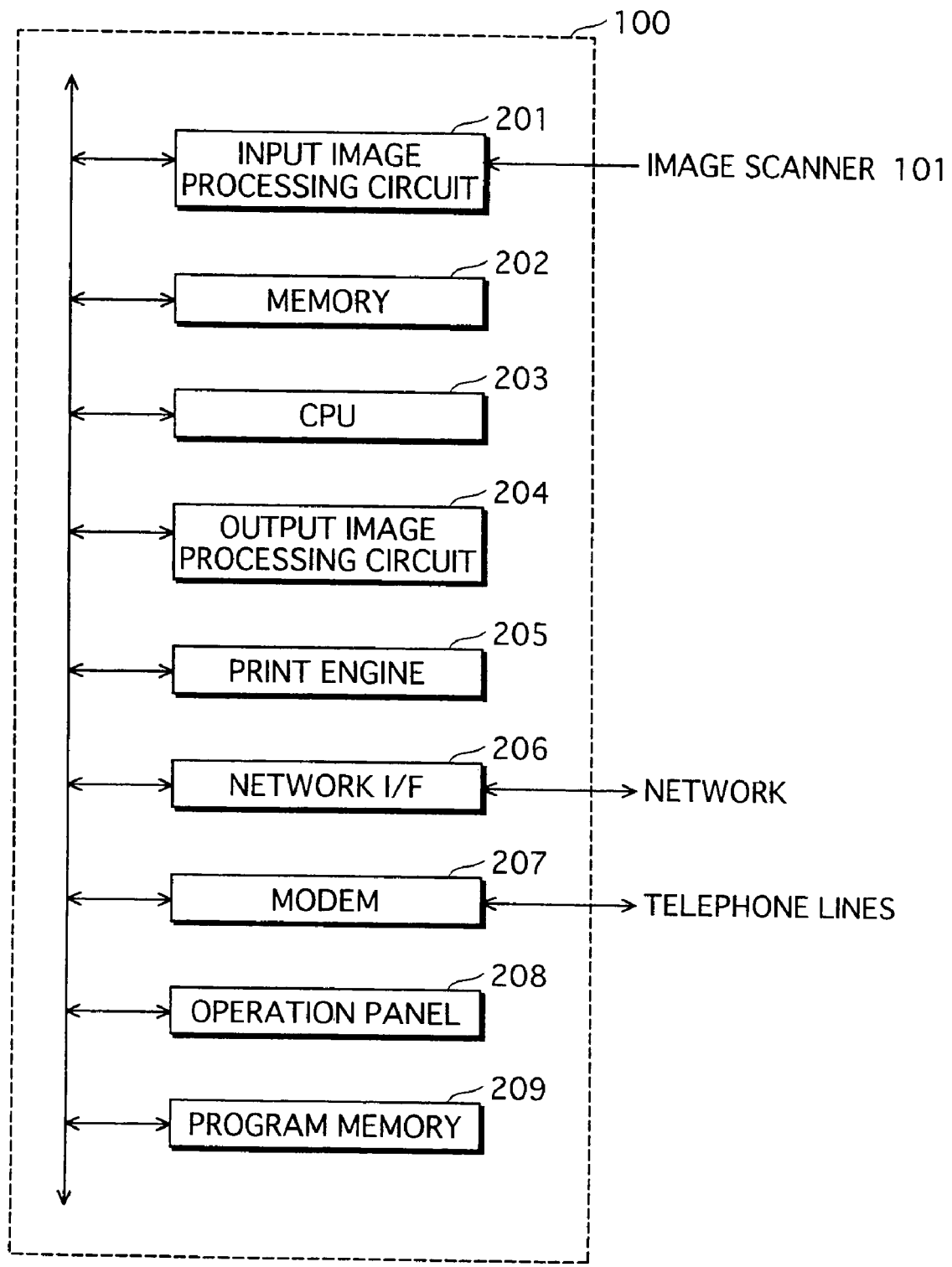
FIG. 3 is a block diagram showing a structure of main hardware included in an image forming apparatus 100 according to the embodiment.

FIG. 3 is a block diagram showing a structure of main hardware included in the image forming apparatus 100. As FIG. 3 shows, the image forming apparatus 100 includes an input image processing circuit 201, a memory 202, a CPU 203, an output image processing circuit 204, a print engine 205, a network interface 206, a modem 207, an operation panel 208, and a program memory 209.

The input image processing circuit 201 receives image data from the image scanner 101, and performs processing, such as color conversion, color adjustment, resolution conversion and area judgment, on the input image.

The memory 202 stores image data processed by the input image processing circuit 20l, and constituted of a semiconductor memory such as a DRAM (Dynamic Random Access Memory), a magnetic memory such as a hard disk, or the like.

The program memory 209 stores programs for various kinds of processing performed by the CPU.

The CPU 203 reads the programs stored in the program memory 209 to control the whole image forming apparatus 100, to detect and display an input from the operation panel, to change a file format of the image data file (JPEG (Joint Photographic Experts Group), PDF, TIFF (Tagged Image File Format) and compact PDF) and to create an e-mail, and so on.

The output image signal processing circuit 204 performs the screen control, smoothing processing, PWM (Pulse Width Modulation) control and so on to generate an output image data.

The print engine 205 forms an image on the recording paper in accordance with the output image data.

If the output image is a color image, the print engine 205 uses four colors, namely yellow, magenta, cyan and black to form the image, and if the output image is a monochrome image, the print engine 205 uses only black to form the image.

The network interface 206 is an interface for transmitting and receiving an e-mail and so on via a network, and performs a protocol processing and so on.

The modem 207 includes an NCU (Network Control Unit), and performs modulation and demodulation processing and protocol processing for transmitting and receiving a facsimile, and interfacing with a telephone circuit.

The operation panel 208 includes operation keys and a display panel, and receives an instruction input by a user, such as an operation of inputting a destination address of a facsimile and an e-mail, a selection of a condition for the scanning, a selection of a format of the image file, a start and a pause of various kinds of processing.

(3) Generation of Compact PDF File

Figure 1:
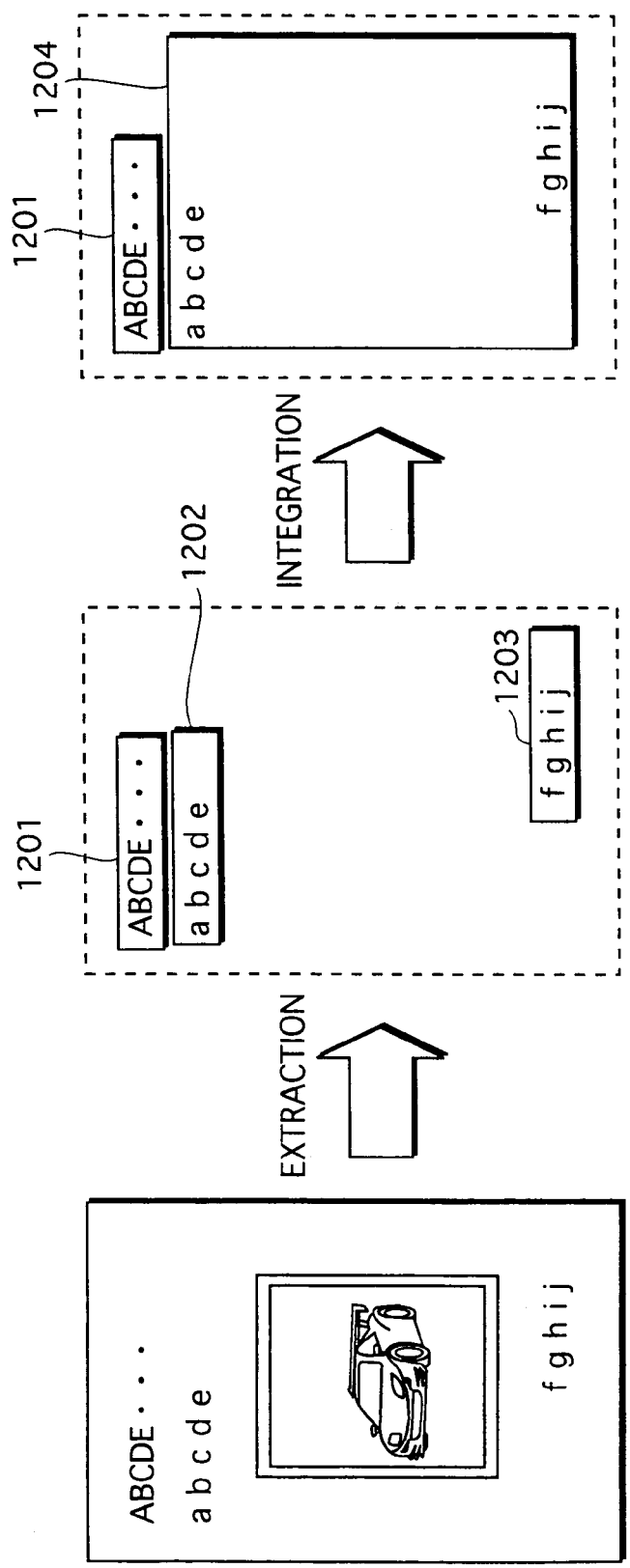
FIG. 1 is shows an example processing procedure for creating a compact PDF file according to a conventional technique.

The following describes a procedure for generating a Compact PDF file. In the following explanation, it is assumed that a Compact PDF file is generated from an image that is the same as the image shown in FIG. 1, which includes characters having different colors.

Figure 4:
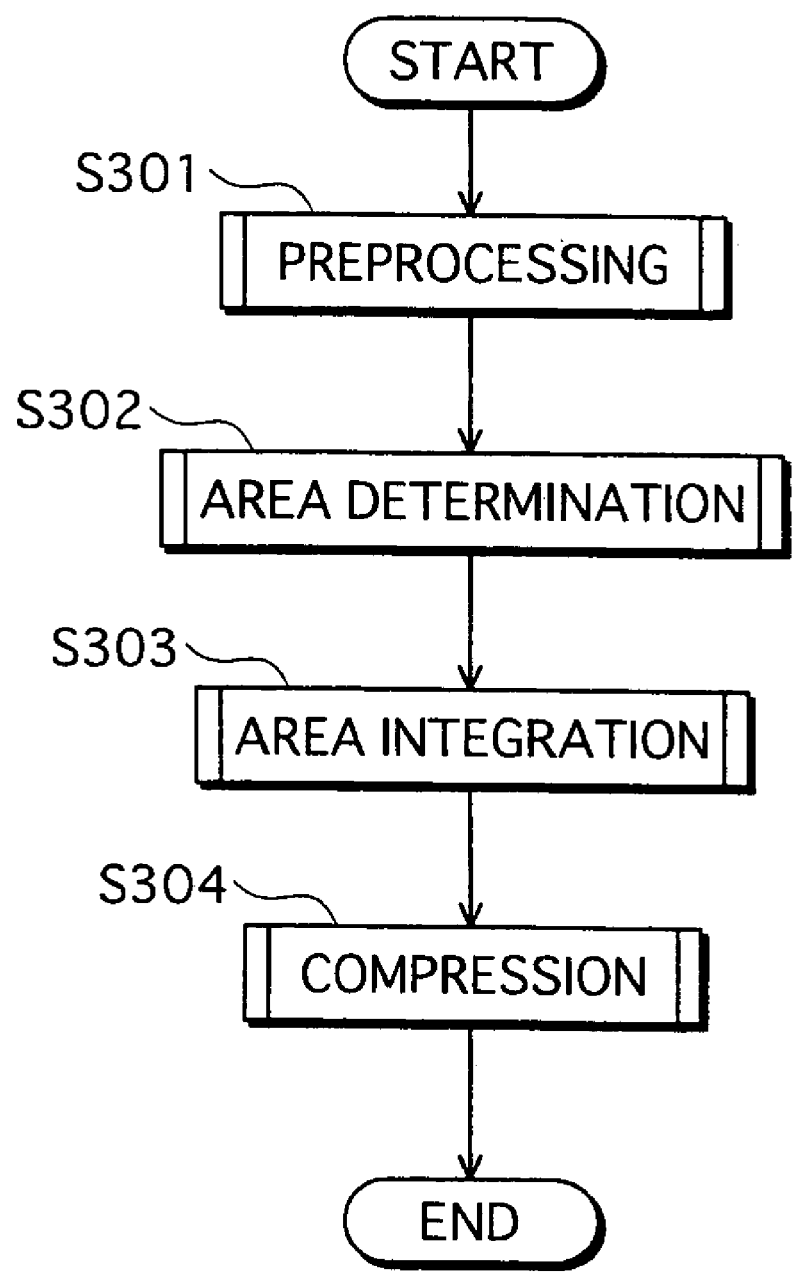
FIG. 4 is a flowchart showing a processing procedure for creating a Compact PDF file, performed by the image forming apparatus 100.

FIG. 4 is a flowchart showing a procedure for generating a Compact PDF file. As FIG. 4 shows, upon receiving color 24-bit image data from the image scanner 101, the image forming apparatus 100 firstly performs, as preprocessing, resolution change processing, ground removing, and so on. (S301).

Next, the image forming apparatus 100 detects objects from the image data resultant from the preprocessing, and performs area determination for determining areas to be image layers (S302). Then, the image forming apparatus 100 refers to an attribute of the objects included in each area and performs area integration for integrating the areas including objects sharing a common attribute (S303), and performs compression for compressing images of each image layer (S304). Then, the image forming apparatus 100 finishes the procedure.

(4) Area Determination (S302)

The following describes the area determination processing (S302). The area determination (S302) is performed for distinguishing between character areas and picture/background areas (the areas other than the character areas) included in the image data.

Figure 5:
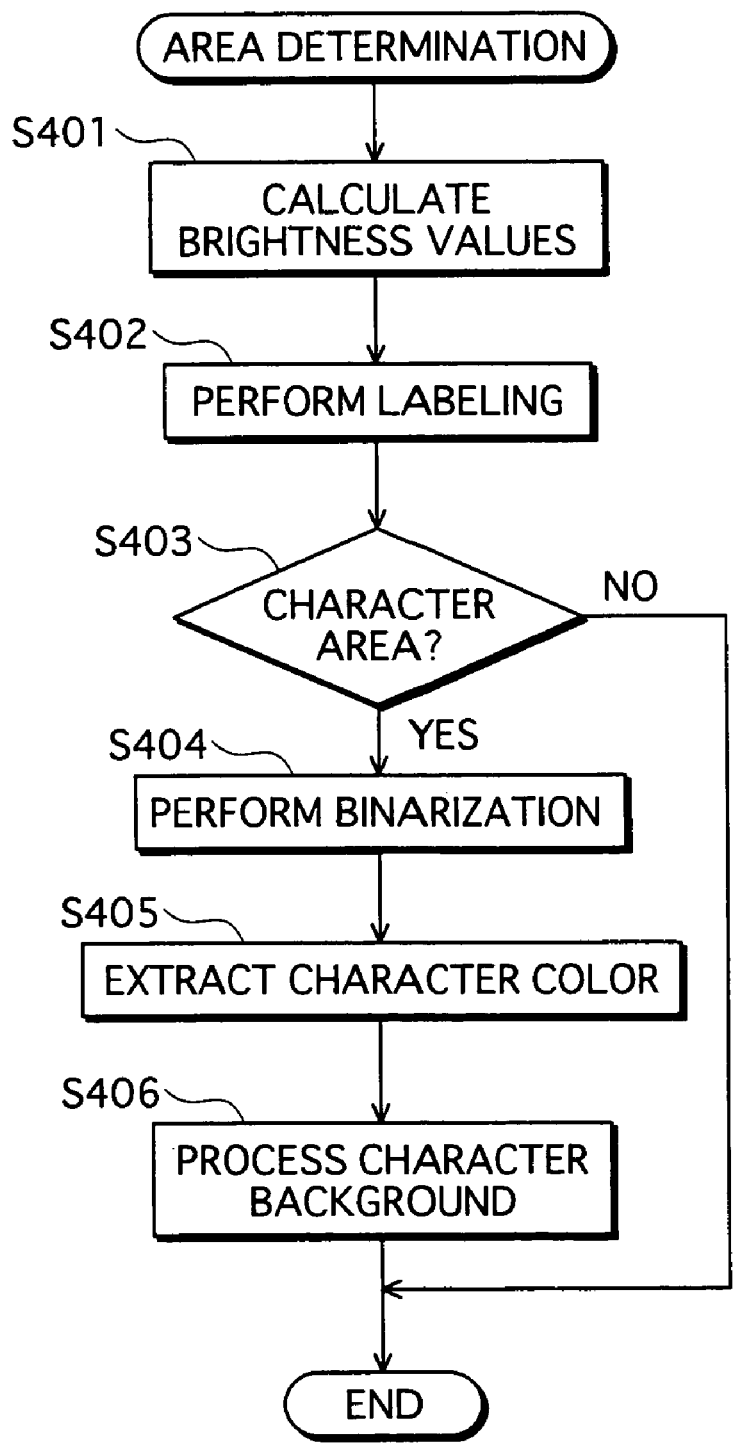
FIG. 5 is a flowchart showing a detail of area determination processing (S302) performed by the image forming apparatus 100.

FIG. 5 is a flowchart showing the detail of the area determination (S302). As FIG. 5 shows, the image forming apparatus 100 generates an 8-bit gray scale image from a 24-bit full color image (S401). Then, the image forming apparatus 100 performs labeling to detect objects included in the images, and identifies areas respectively including the objects (S402).

For example, if the object size is smaller than a predetermined size, the image forming apparatus 100 determines that the area including the object is the character area. However, note that the method for identifying the areas is not limited to this. For example, the image forming apparatus 100 may judge that the area is character area if a ratio of the number of edge pixels included in an object to the total number of pixels constituting the object is not smaller than a predetermined ratio.

If the identified area is the character area (S403: YES), the image forming apparatus 100 performs binarization (S404), and detects the character color (S405). Also, the image forming apparatus 100 removes the character pixels identified by the binarization from the 24-bit full color image so as to form a character background (S406). These Steps are performed for all the areas.

(5) Area Integration (S303)

The following describes the area integration processing (S303). The image forming apparatus 100 integrates areas, respectively including characters having the same character color, and the change of the total size of the integrated areas is within a predetermined range.

Figure 6:
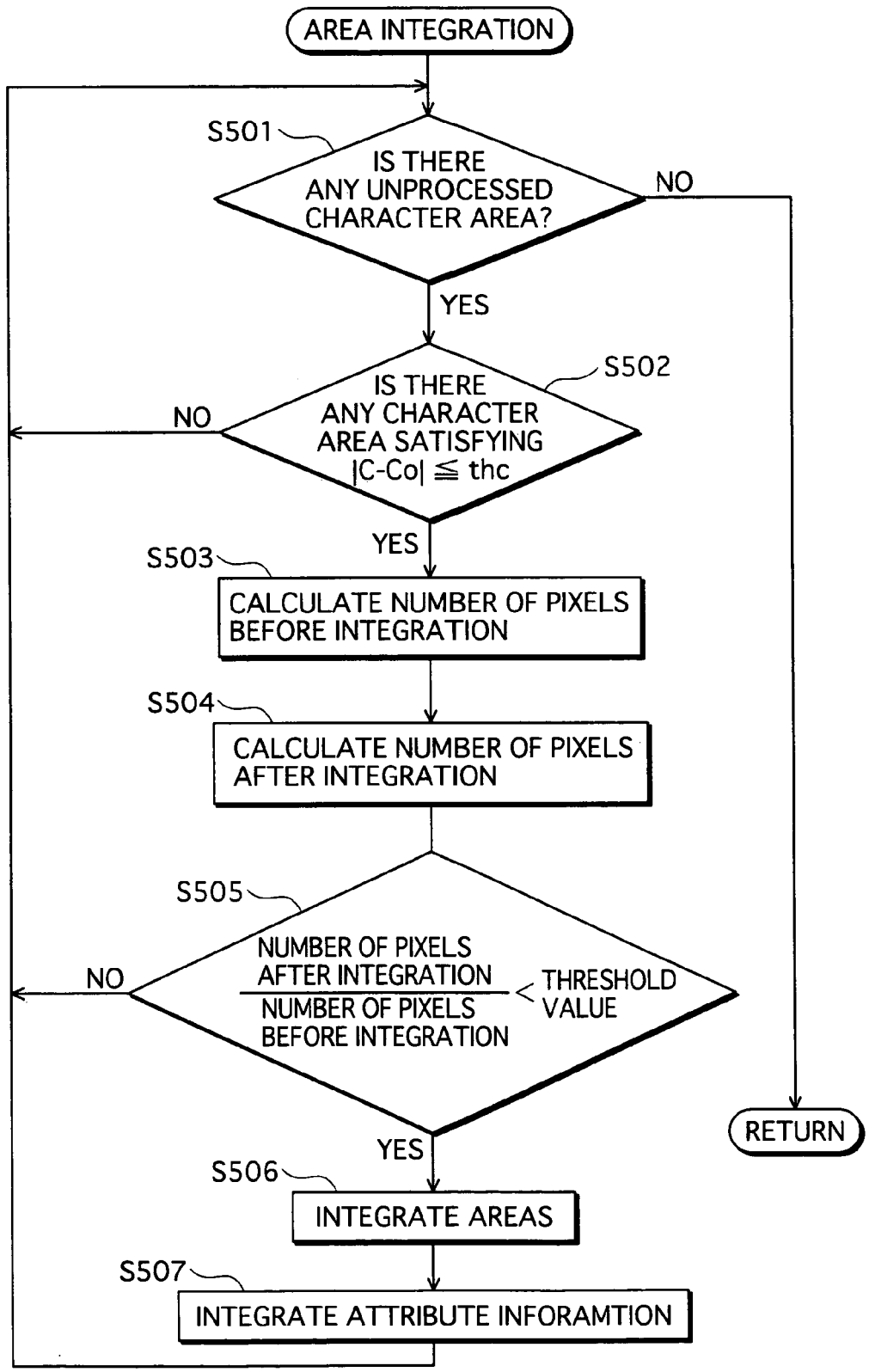
FIG. 6 is a flowchart showing a detail of area integration processing (S303) performed by the image forming apparatus 100.

FIG. 6 is a flowchart showing the detail of the area integration (S303). As FIG. 6 shows, if there are unprocessed character areas (S501: YES), the image forming apparatus 100 selects one of the unprocessed character areas. Then, the image forming apparatus 100 searches for a character area that includes a character whose color is C, where the difference between the color C and the color Co of the character included in the selected area is not larger than a predetermined threshold value thc. Note that the area including the character whose color is C, which satisfies /C−Co/≦thc, is hereinafter called "a similar-color area".

If there is no similar-color area, (S502: NO), the image forming apparatus 100 searches for other unprocessed areas. If no unprocessed area has been found (S501: NO), the image forming apparatus 100 finishes the area integration.

If there is any similar-color area (S502: YES), the image forming apparatus 100 calculates, as the number of pixels included in the areas before being integrated, the total of the number of the pixels included in the selected character area and the number of the pixels included in the similar color area (S503). Also, the image forming apparatus 100 calculates the number of pixels included in the integrated area (S504), and judges whether a ratio of the number of the pixels included in the integrated areas to the number of the pixels include in the unintegrated area is less than a predetermined threshold value. In other words, the image forming apparatus 100 judges whether <Numerical Expression 1> is satisfied:

Number of Pixels after Integration/Number of Pixels before Integration<Threshold Value   <Numerical Expression 1>

If the Numerical Expression 1 is satisfied (S505: YES), the image forming apparatus 100 integrates the areas (S506), and also integrates the attribute information indicating the position of the area, the character color, and so on (S507). Then, the image forming apparatus 100 searches for any unprocessed character area is remaining. If not (S501: NO), the image forming apparatus 100 finishes the area integration.

(6) Compression (S304)

The compression (S304) is described next. The compression (S304) is performed for compressing areas regard less of whether the areas are integrated. For this purpose, the image processing apparatus 100 performs lossless compression on character areas using an MMR (Modified Modified READ) method, and performs lossy compression on areas other than the character areas using a JPEG method.

This secures readability of the decompressed character area. Regarding the areas other than the character areas, it is possible to compress the areas at a high compression ratio to reduce the size of the PDF file, because the effect of the compression on the image quality is minor, though sharpness will be decreased.

(7) Threshold Value

The threshold value of the Numerical Expression 1 is described next.

Figure 7:
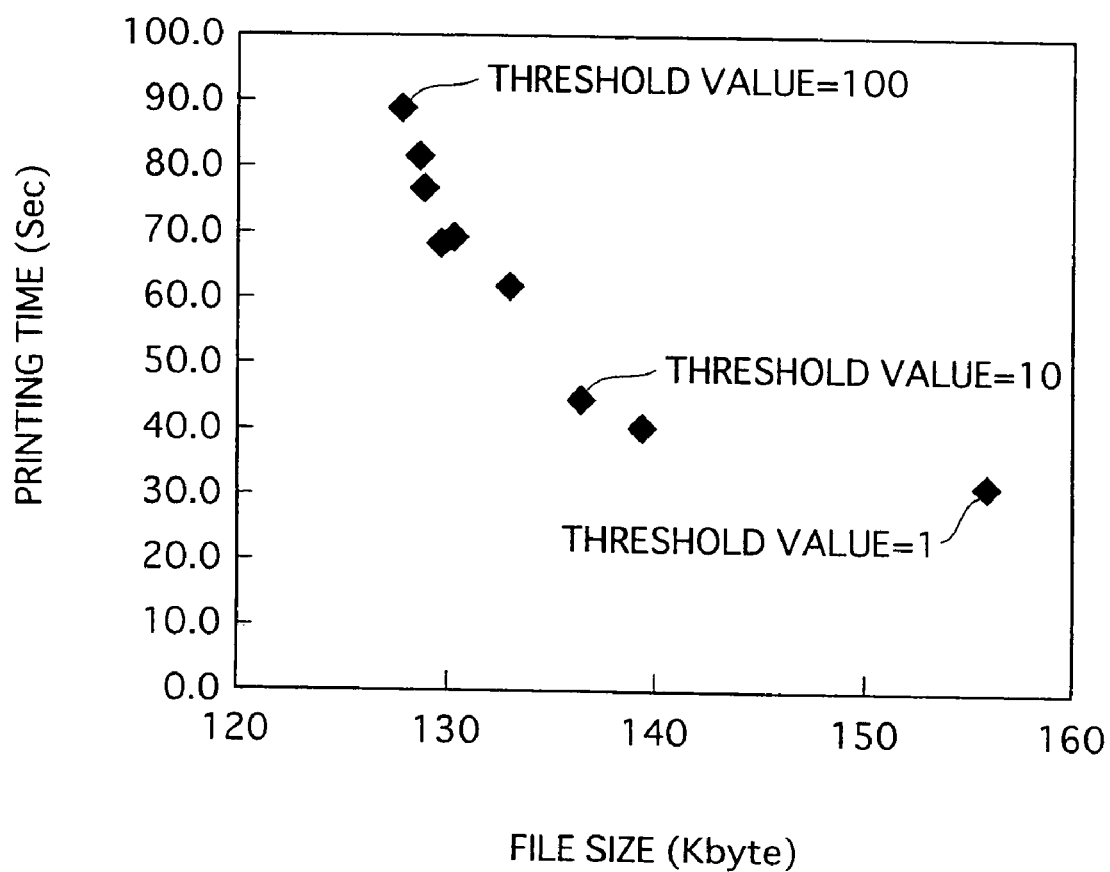
FIG. 7 is a correlation diagram showing a relation between a file size and a printing time.

FIG. 7 is a correlation diagram showing a relation between a file size and a printing time. In FIG. 7, the vertical axis represents the printing time, and the horizontal axis represents the PDF file size.

As FIG. 7 shows, if the threshold value is small and the number of the areas to be integrated is small, the number of the image layers increases and the file size increases. In this case, however, the integration does not generate many blank areas and the time required for the printing does not increase.

On the other hand, if the threshold value is large, the number of areas decreases and the file size decreases. However, the integration generates many blank areas. This increases the printing time.

The number of pixels can be increased by the integration of the areas, but can not be decreased. In other words, the ratio of the number of the pixels included in the integrated area to the number of the pixels included in the unintegrated areas is always 1 or more. Therefore, if the threshold value is 1, no areas will be integrated. As a result, no blank space will be generated, and this prevents the increase of the printing time. This is a conventional technique that does not integrate areas.

If the threshold value is sufficiently large, the areas will always be integrated, and in this sense, the file size will be minimized. However, since this generates many blank spaces without limitation, it is possible that the printing time becomes extremely long, depending on the condition of the original image. This is a conventional technique that completely integrates the areas.

In contrast, as FIG. 7 shows, if the printing time has been already decreased to some extent, the file size greatly increases as the printing time slightly decreases. Also, if the file size has been already decrease to some extent, the printing time greatly increases as the file size slightly decreases.

Therefore, a method that does not perform integration at all or a method that integrates all the regions, such as the conventional method, provides many disadvantages, but few advantages.

If the threshold value is 10, neither the file size nor the printing time increases extremely, and both of them can be reduced. In fact, when the threshold value is 1, the file size is approximately 156K bytes and the printing time is approximately 32 seconds, and when the threshold value is 100, the file size is approximately 127K bytes and the printing time is approximately 88 seconds.

On the contrary, when the threshold value is 10, the file size is approximately 136 k bytes and the printing time is approximately 44 seconds. Compared to the case where the threshold value is 1, the file size is reduced by approximately 14.7%, but printing time is increased by only approximately 37.3%. Also, compared to the case where the threshold value is 100, the printing time is reduced to a half, but the file size increase only approximately 6.6%.

(8) Modifications

The preferred embodiment of the present invention is described above based on the preferred embodiment. However, the present invention is not limited to the embodiment. The following are examples of possible modifications.

(a) Although not mentioned in the embodiment above, in the area integration processing (S303), if there is an unprocessed character area (S501: YES), it does not matter whether an area to be integrated to the unprocessed character area has been generated by integration or not, as long as the area is the similar-color area.

The advantageous effect is achievable regardless of whether the character area to be integrated has been already integrated or not.

(b) In the above-described embodiment, the case where whether to integrate areas is judged using the <Numerical Expression 1>. However, the present invention is not limited to this. Other numerical expressions may be used.

For example, it may be judged based on whether the difference between the number of the pixels included in the areas before integration and the number of pixels included in the integrated area and the area is less than a predetermined threshold value. In other words, it may be judged whether <Numerical Expression 2> is satisfied:

Number of Pixels after Integration−Number of Pixels before Integration<Threshold Value   <Numerical Expression 2>

The number of pixels does not decrease by the integration. Therefore, the above-described difference is always 0 or more.

The advantageous effect is achievable regardless of what numeral expression is used, as long as the character areas are not integrated if the number of the pixels increases by the integration by more than a predetermined value.

Note that the impact of the increase of the pixels due to the integration depends on the number of the pixels before the integration. For example, if the number of pixels before the integration is large, the increase to some extent can not be a serious problem. However, if the number of the pixels before the integration is small, the increase might have a significant impact event though the increase of the pixels is small.

From this viewpoint, the <Numerical Expression 1> is preferable, because whether to integrate is judged by the ratio of the number of the pixels after the integration to the number of the pixels before the integration, and the impact of the increase of the pixels is thereby taken into consideration.

(c) In the above-described embodiment, the case where only one threshold value is used in the <Numerical Expression 1> is described. However, the present invention is not limited to this. The following is an example of a possible modification.

FIG. 8 shows a table in which a threshold values are respectively assigned to ranges of a ratio of the total size of character areas, which are to be integrated, to the size of the whole document. As FIG. 8 shows, the threshold value decreases as the size ratio increases. This size ratio is, for example, given as a ratio of the number of the pixels.

In the case where the increase of the number of the pixels to some extent can not be a serious problem if the number of pixels before the integration is large but might have a significant impact if the number of the pixels before the integration is small, it is possible to balance the printing time and the file size by switching the threshold value in such a manner.

Figure 9:
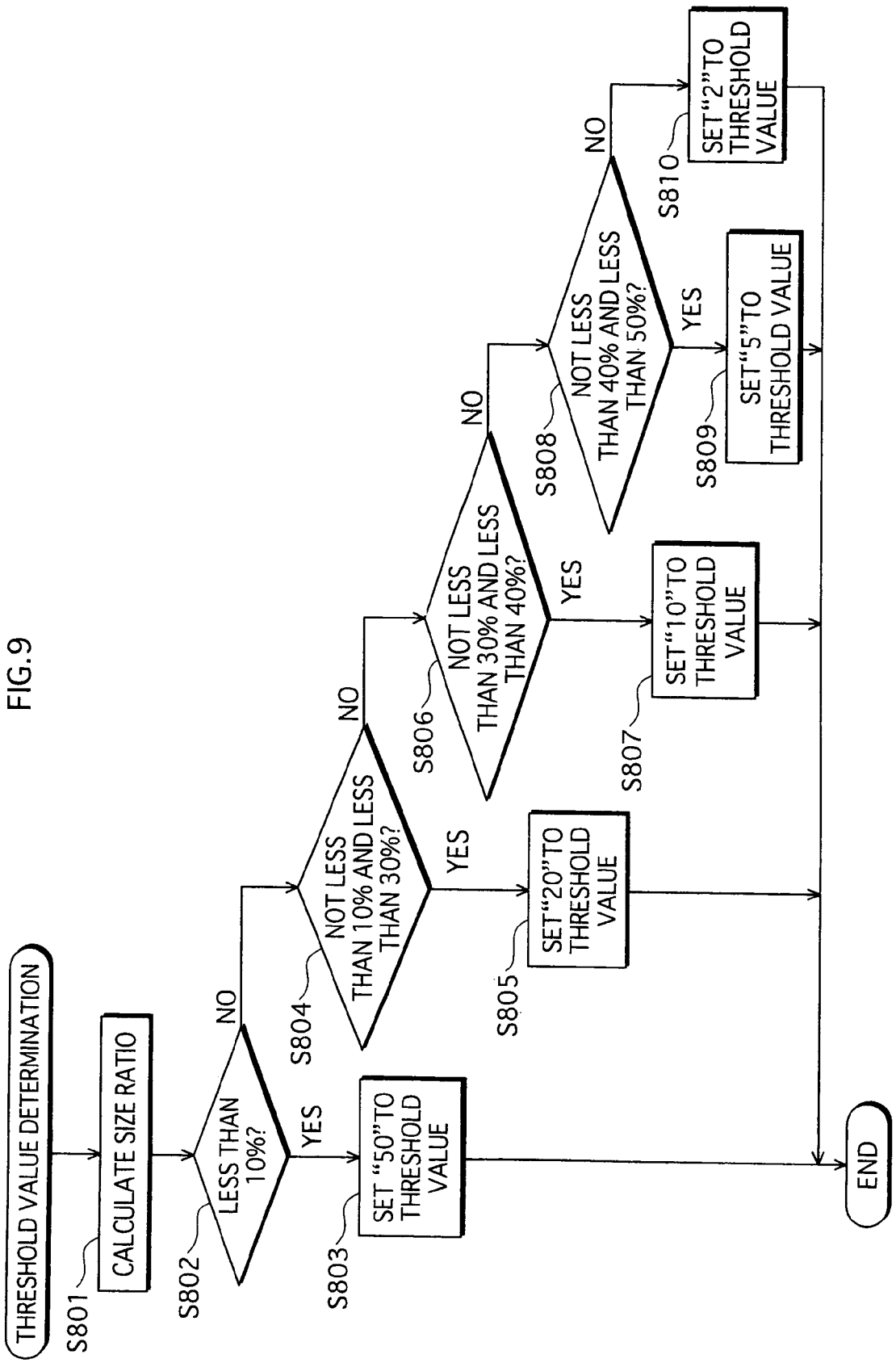
FIG. 9 is a flowchart showing a detail of processing performed by an MFP according to a modification (c) of the present invention for determining a threshold value based on the table of FIG. 8.

FIG. 9 is a flowchart showing operations performed by the MFP for determining the threshold value based on the table of FIG. 8. As FIG. 9 shows, the MFP firstly calculates, as a ratio of the number of pixels, the ratio of the size of the character areas to be integrated to the size of the whole document (S801). Then, if the size ratio is less than 10% (S802: YES), a value "50" is set to the threshold value (S803). If the size ratio is not less than 10% and less than 30% (S804: YES), a value "20", is set to the threshold value (S805).

If the size, ratio is not less than 30% and less than 40% (S806. YES), a value "10" is set to the threshold value (S807). If the size ratio is not less than 40% and less than 50% (S808: YES), a value "5" is set to the threshold value (S809). If the size ratio is 50% or more (S808: NO), a value "2" is set to the threshold value (S810).

With this structure, it is possible to balance the printing time and the file size by setting an appropriate value to the threshold value in accordance with the size ratio.

(d) In the above-described embodiment, the case where the character areas are integrated is mainly explained. However, the present invention is not limited to this. The following is an example of a possible modification.

Whether to integrate areas other than the character areas may also be determined based on the increase of the pixels due to the integration. This also achieves the advantageous effect. If this is the case, areas having the same attribute can be integrated in the same manner as character areas having the same character color.

(e) In the above-described embodiment, the case of balancing the printing time and the file size is mainly explained. However, the present invention is not limited to this. The following is an example of a possible modification.

For example, it is possible to balance a time required for displaying images and the file size. The advantageous effect can be achieved by any processing as long as it is capable of balancing a time required for decompressing a PDF file and the file size.

(f) In the above-described embodiment, the case where a predetermined fixed value is used for judging whether to integrate the areas is mainly explained. However, the present invention is not limited to this. The following is an example of a possible modification.

Figure 10:
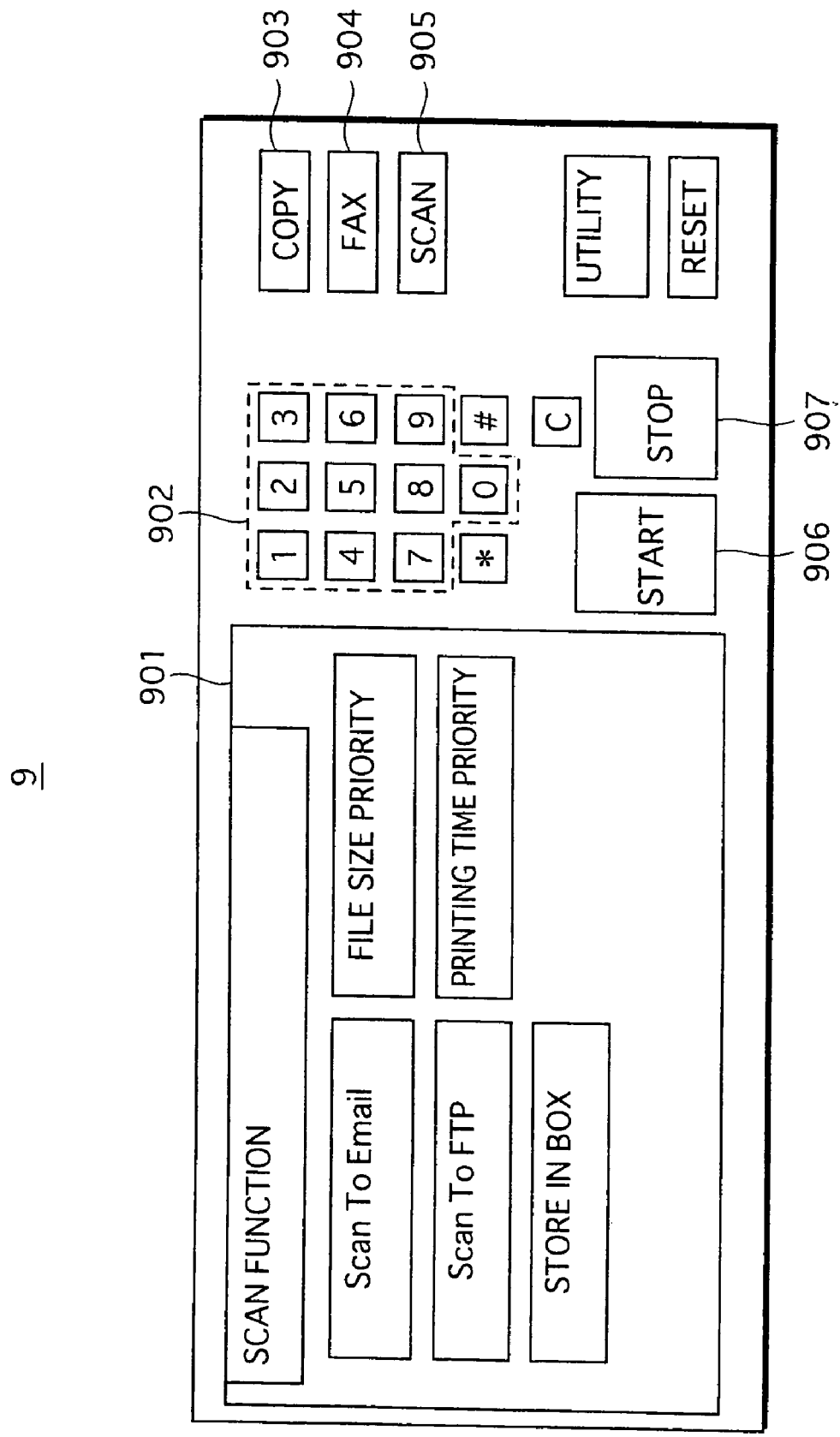
FIG. 10 shows an operation panel included in an MFP according to a modification (f) of the embodiment which receives a designation of a threshold value from a user.

The threshold value may be designated by the user of the MFP. FIG. 10 shows an operation panel for receiving a designation of a threshold value from a user. As FIG. 10 shows, an operation panel 9 includes a touch-sensitive panel 901, a numeric keypad 902, a copy key 903, a fax key 904, a scan key 905, a start key 906, and a stop key 907.

The touch-sensitive panel 901 displays information corresponding to a function to be used by the user. The touch-sensitive panel 901 also displays touch-sensitive keys for receiving an input from the user. To generate a PDF file from a scanned images, the touch-sensitive panel 901 displays a touch-sensitive key for giving priority to the printing time and a touch-sensitive key for giving priority to the file size. A value corresponding to the touch-sensitive key selected by the user will be used as the threshold value.

The numeric keypad receives an input of a number from the user.

The copy key 903, the fax key 904 and the scan key 905 are pressed for displaying information relating to a copy function, a fax function and a scan function respectively on the touch-sensitive panel 901.

The start key 906 is for starting the processing specified by the user. The stop key 907 is for interrupting the processing that is being executed.

Figure 11:
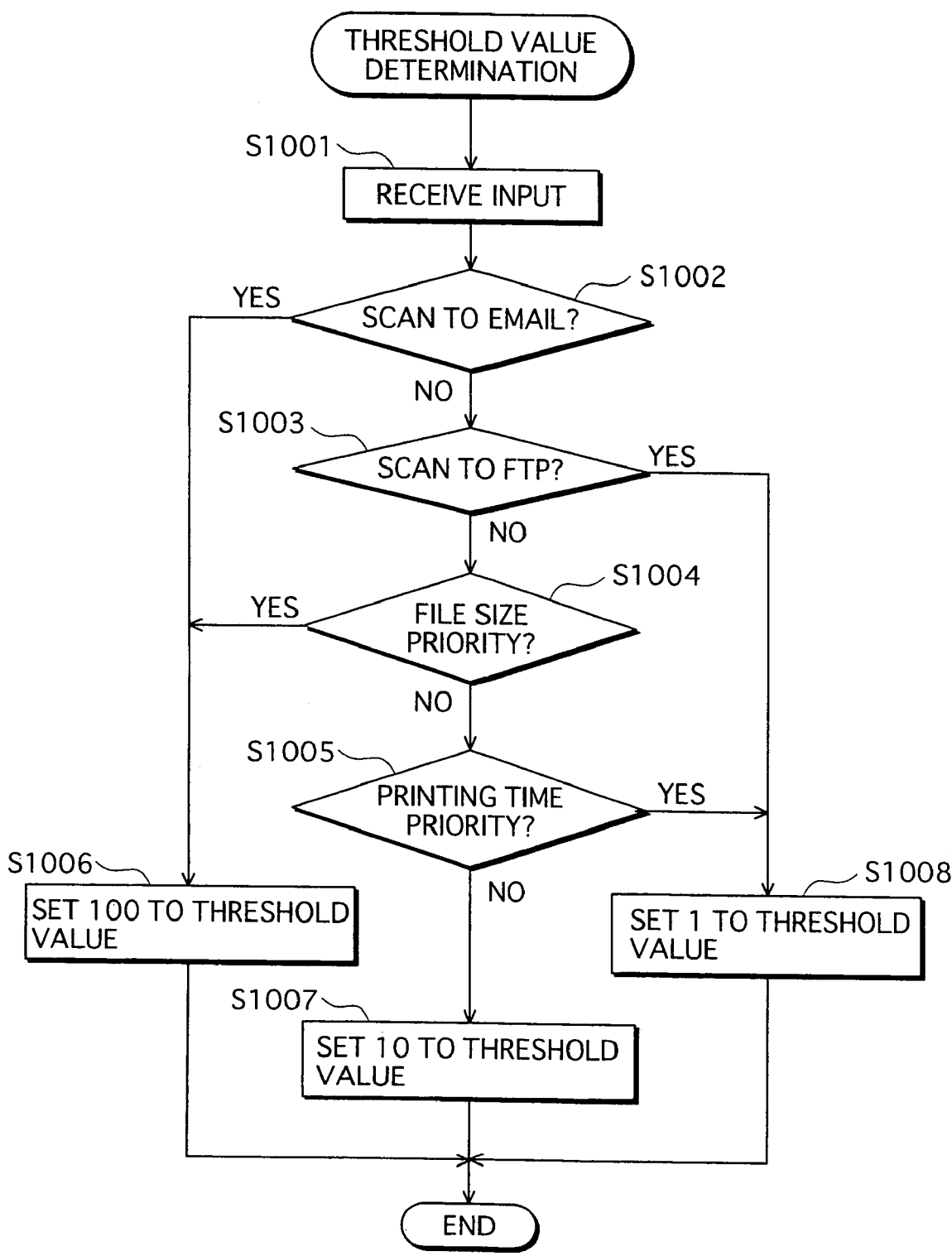
FIG. 11 is a flowchart showing operations performed by the MFP according to the modification (f), which are performed when the MFP receives the designation of the threshold value from the operation panel.

FIG. 11 is a flowchart showing operations performed by the MFP for receiving a designation of the threshold value input from the operation panel 9. As FIG. 11 shows, the MFP receives a user's input from a touch-sensitive panel 901 (S1001).

If the touch-sensitive key selected by the user is a "Scan to Email" key (S1002: YES), a value "1300" is set to the threshold value (S1007). If the key selected by the user is not the "Scan to Email" key (S1002: NO), but is a "Scan to FTP" key (S1003: YES), a value "1" is set to the threshold value (S1008).

If the key selected by the user is not the "Scan to FTP" key (S1003: NO), but is a "File Size Priority" key (S1004: YES), a value "100" is set to the threshold value (S1006). If the key selected by the user is not the "File Size Priority" key (S1004: NO), but is a "Printing Time Priority" key (S1005: YES), a value "1" is set to the threshold value (S1008). If the key selected by the user is even not the "Printing Time Priority" key, in other words, if a "Store in Box" key is selected by the user, a value "10" is set to the threshold value (S1007).

With such operations, it is possible to meet the user's need in a flexible manner, because The MFP uses a threshold value corresponding to the designation by the user.

In the case of the "Scan to Email", it is necessary to reduce the file size to attached the scanned image to an E-mail and transmit it. Therefore, it is effective that the value "100" is set to the threshold value, in the same manner as the case of the "File Size Priority".

In the case of the "Scan to FTP", the scanned image is to be transmitted by the FTP (File Transfer Protocol), and the restriction on file size is not very severe. Therefore, with consideration of the printing time, it is effective that the value "1" is set to the threshold value.

In the case of "Store in Box", the PDF file is to be stored in the MFP. Therefore, it is preferable that the file size is reduced. On the other hand, since the PDF file stored in the BOX in the MFP is usually printed out by the MFP, the printing time should be reduced as well. Therefore, it is appropriate to set a value "10" to the threshold value to balance the file size and the printing time.

(g) In the above-described embodiment, an MFP is taken as an example for the explanation. However, the present invention is not limited to this. For example, the present invention is applicable to a dedicated scanner. Also, regarding other apparatuses that generate PDF files, the same effect can be achieved.

(h) In the above-described embodiment, a PDF file is taken as an example for the explanation. However, the present invention is not limited to this. The present invention is applicable to file formats other than the PDF as well. In the case of performing the integration on a file format in which each of a plurality of areas is separately compressed and attribute information is attached to each area, the same advantageous effect can be achieved.

(i) In the above-described embodiment, the case where the MFP 1 compresses the imaged at a scanned by the MFP 1 itself is explained. However, the present invention is not limited to this. The following is an example of a possible modification.

Figure 12:
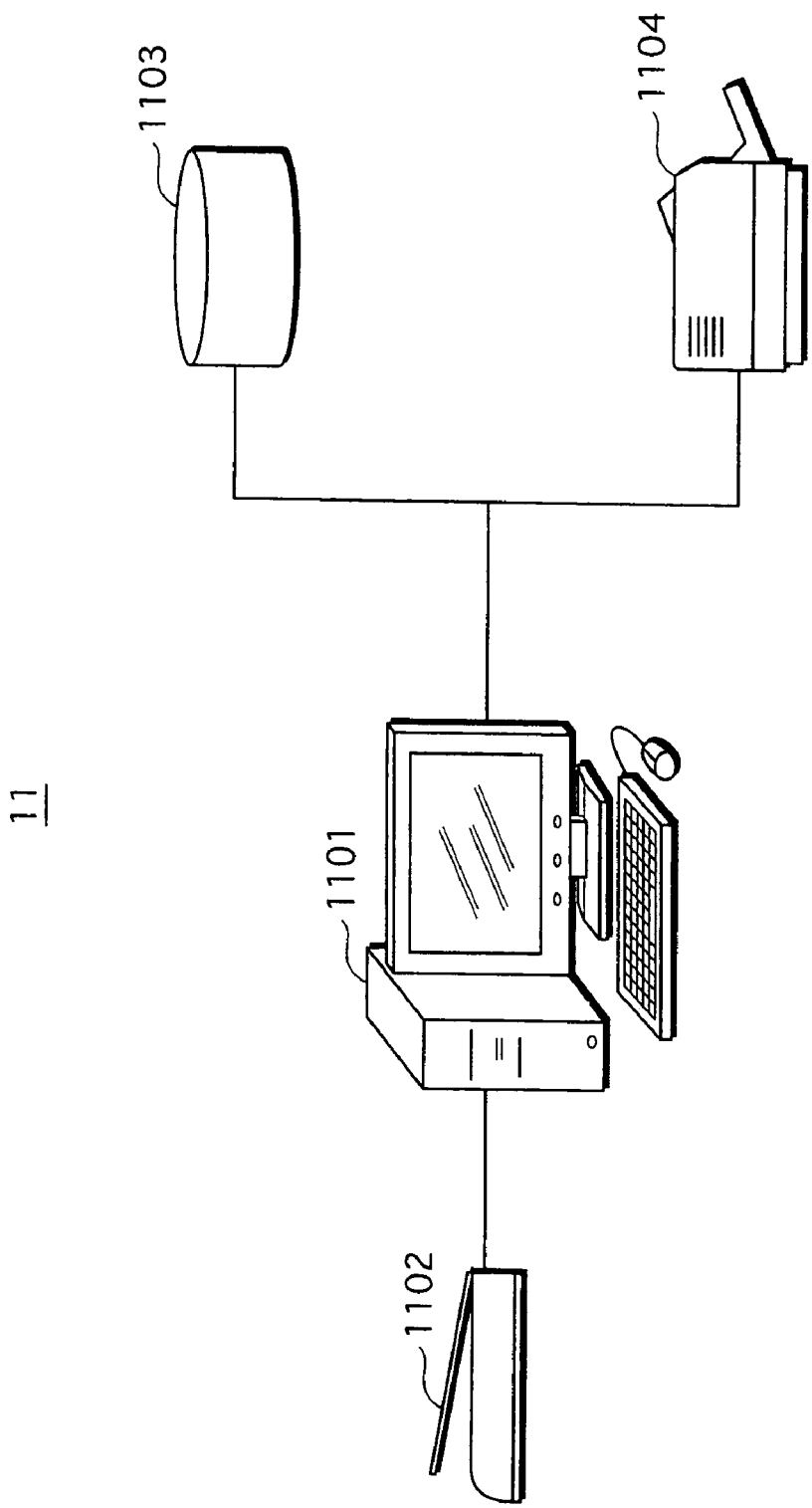
FIG. 12 shows a structure of an image processing system according to a modification (i) of the embodiment.

FIG. 12 shows a structure of an image processing system according to the modification of the present invention. As FIG. 12 shows, the image processing system 11 includes a processing apparatus 1101, an image scanner 1102, an external storage apparatus 1103 and an image output apparatus 1104. The image processing apparatus 1101, the image scanner 1102, the external storage apparatus 1103 and the image output apparatus are connected to each other by a communications line.

The image scanner 1102 scans images on each page of a document to generate image data. The image scanner 1102 transmits the image data to the image processing apparatus 1101 via the communications line.

Upon receiving the image data from the image scanner 1102, the image processing apparatus 1101 compresses the image data in the same manner as the above-described MFP. The image processing apparatus 1101 transmits the compressed image data to the external storage apparatus 1103. For example, a personal computer may be used as the image processing apparatus 1101.

The external storage apparatus 1103 includes a hard disk drive. Upon receiving the image data compressed by the image processing apparatus 1101 via the communications line, the external storage apparatus 1103 stores the data in the hard disk drive.

Upon receiving a print instruction designating image data from the image processing apparatus 1101 via the communications line, the image output apparatus 1104 reads out the designated image data from the external storage apparatus 1103. Then, the image output apparatus 1104 decompresses the image data, and print the image data on a recording paper.

With the stated structure, the image processing system is capable of reducing the size of the decompressed image data while reducing the processing time required for the image output apparatus 1104 to decompress the image data.

(j) In the above-described embodiment, the present invention is embodied as the image processing apparatus. However, the present invention is not limited to this.

In other words, the present invention may be embodied as an image processing method to be executed by the MFP 1 and the image processing apparatus 1101 described above. Also, the present invention may be embodied as an image processing program for having the computer operate as the image processing apparatus 1101. In both cases, the advantageous effect is achievable.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing method for extracting a plurality of rectangular areas from image data, compressing an image included in each area, and giving an attribute of the area to the compressed image, the image processing method comprising:
   a data receiving step of receiving image data by an input image processing circuit of an image processing device;
   a first calculation step of calculating by a calculator a first number that is a total number of pixels included in areas of the image data sharing a common attribute;
   a second calculation step of calculating by the calculator a second number that is a number of pixels included in an integration area that is a rectangular area including the areas of the image data sharing the common attribute;
   a judging step of judging by a judging unit, based on the first number and the second number, whether or not to integrate the areas of the image data sharing the common attribute into the integration area; and
   an integration step of integrating by an integration unit the areas of the image data sharing the common attribute if the judging step judges affirmatively.

2. The image processing method of claim 1, wherein the judging step judges affirmatively if a difference between the first number and the second number is not more than a predetermined value.

3. The image processing method of claim 2 further comprising
   a receiving step of receiving a threshold value, wherein the judging step uses the threshold value as the predetermined value.

4. The image processing method of claim 2, wherein the judging step increases the predetermined value as the first number decreases.

5. The image processing method of claim 1, wherein the integration area includes two rectangular areas.

6. The image processing method of claim 1, wherein
   the plurality of areas to be extracted from the image data are character areas, and
   the integration area includes a plurality of character areas in which a difference of character colors is within a predetermined range.

7. A computer readable recording medium storing an image processing program for extracting a plurality of rectangular areas from image data, compressing an image included in each area, and giving an attribute of the area to the compressed image, the image processing program having a computer perform:
   a first calculation step of calculating a first number that is a total number of pixels included in areas sharing a common attribute;
   a second calculation step of calculating a second number that is a number of pixels included in an integration area that is a rectangular area including the areas sharing the common attribute;
   a judging step of judging, based on the first number and the second number, whether or not to integrate the areas sharing the common attribute into the integration area; and
   an integration step of integrating the areas sharing the common attribute if the judging step judges affirmatively.

8. The computer readable recording medium of claim 7, wherein
   the judging step judges affirmatively if a difference between the first number and the second number is not more than a predetermined value.

9. The computer readable recording medium of claim 8 further having a computer perform,
   a receiving step of receiving a threshold value, wherein the judging step uses the threshold value as the predetermined value.

10. The computer readable recording medium of claim 8, wherein
    the judging step increases the predetermined value as the first number decreases.

11. The computer readable recording medium of claim 7, wherein
    the integration area includes two rectangular areas.

12. The computer readable recording medium of claim 7, wherein
    the plurality of areas to be extracted from the image data are character areas, and
    the integration area includes a plurality of character areas in which a difference of character colors is within a predetermined range.

13. An image processing apparatus that extracts a plurality of rectangular areas from image data, compresses an image included in each area, and gives an attribute of the area to the compressed image, the image processing apparatus comprising:
    a calculator operable to calculate a first number that is a total number of pixels included in areas sharing a common attribute and a second number that is a number of pixels included in an integration area that is a rectangular area including the areas sharing the common attribute;
    a judging unit operable to judge, based on the first number and the second number, whether or not to integrate the areas sharing the common attribute into the integration area; and
    an integration unit operable to integrate the areas sharing the common attribute if the judging unit judges affirmatively;
    wherein the judging unit judges affirmatively if the second number is not increased from the first number by more than a predetermined value.

14. The image processing apparatus of claim 13 further comprising
    a receiving unit operable to receive a threshold value, wherein the judging unit uses the threshold value as the predetermined value.

15. The image processing apparatus of claim 13 wherein
    the judging unit increases the predetermined value as the first number decreases.

16. The image processing apparatus of claim 13 wherein
    the integration area includes two rectangular areas.

17. An image processing apparatus that extracts a plurality of rectangular areas from image data, compresses an image included in each area, and gives an attribute of the area to the compressed image, the image processing apparatus comprising:
    a calculator operable to calculate a first number that is a total number of pixels included in areas sharing a common attribute and a second number that is a number of pixels included in an integration area that is a rectangular area including the areas sharing the common attribute;

a judging unit operable to judge, based on the first number and the second number, whether or not to integrate the areas sharing the common attribute into the integration area; and an integration unit operable to integrate the areas sharing the common attribute if the judging unit judges affirmatively;

wherein the judging unit judges affirmatively if a difference between the first number and the second number is not more than a predetermined value;

wherein the plurality of areas to be extracted from the image data are character areas, and wherein the integration area includes a plurality of character areas in which a difference of character colors is within a predetermined range.

18. The image processing apparatus of claim 17, wherein the integration area includes two rectangular areas.

* * * * *